Aug. 23, 1966  R. B. ADAMS  3,267,949
LEVEL CONTROL APPARATUS
Filed March 2, 1964  2 Sheets-Sheet 1
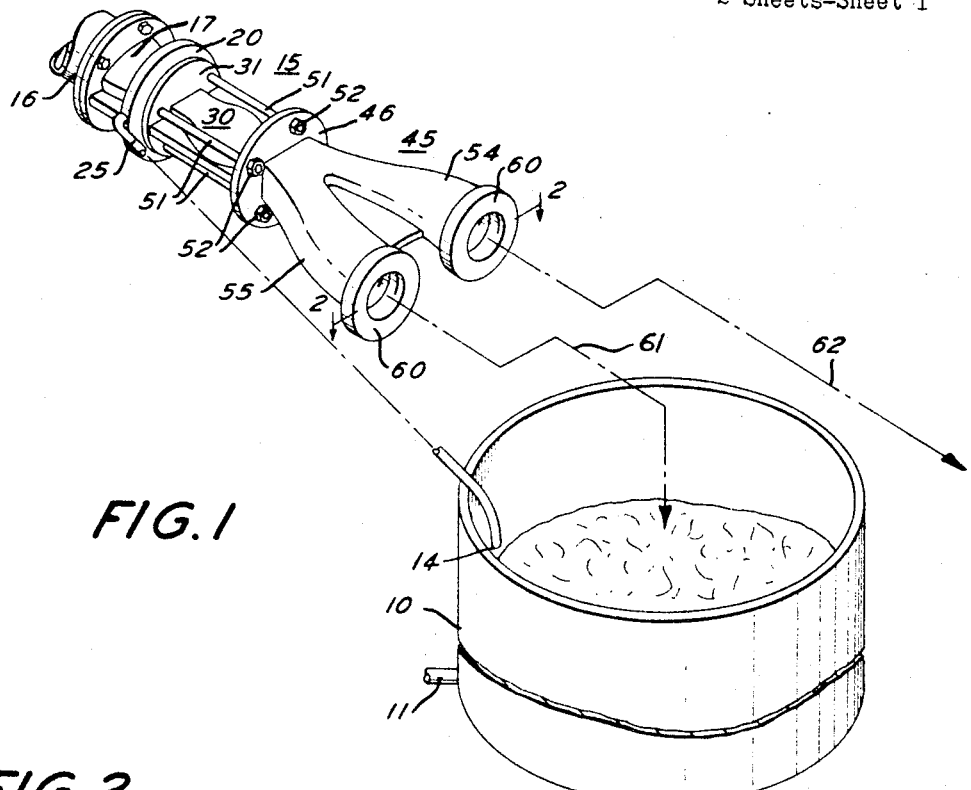
FIG. 1
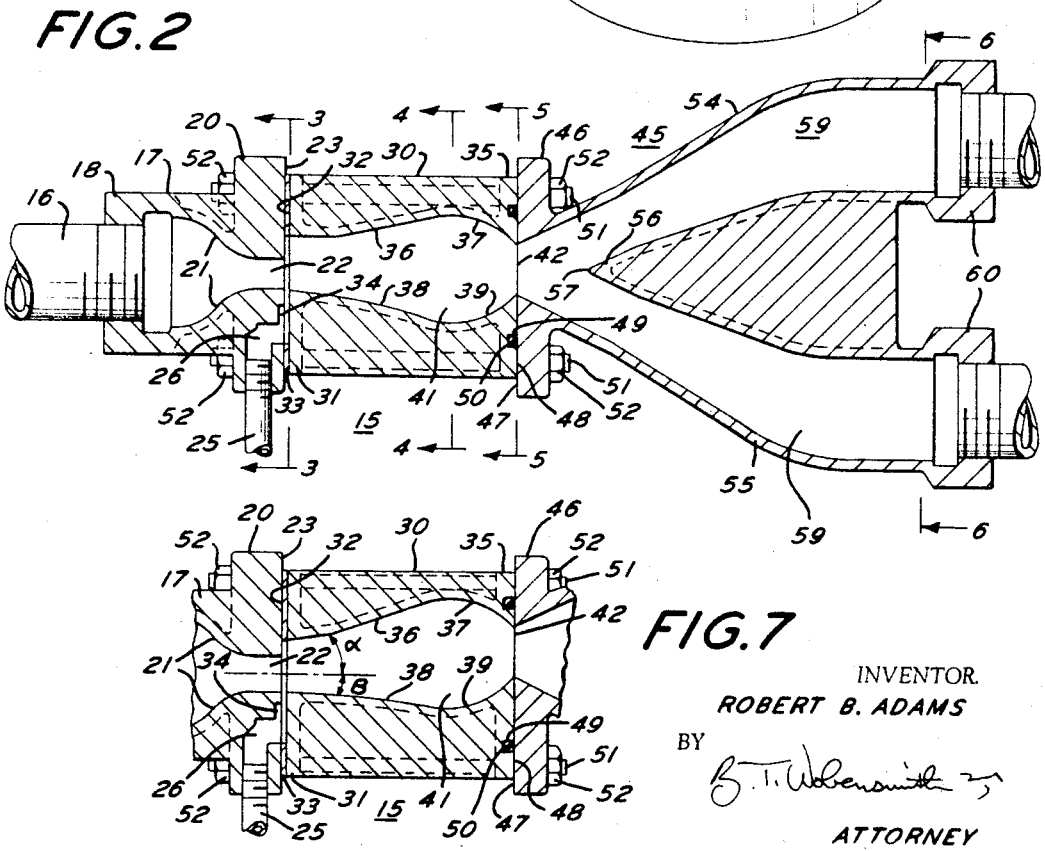
FIG. 2
FIG. 7
INVENTOR.
ROBERT B. ADAMS
BY
ATTORNEY

INVENTOR.
ROBERT B. ADAMS

ATTORNEY 3,267,949
LEVEL CONTROL APPARATUS
Robert B. Adams, Bethayres, Pa., assignor to Moore Products Co., Spring House, Pa., a corporation of Pennsylvania
Filed Mar. 2, 1964, Ser. No. 348,514
5 Claims. (Cl. 137—81.5)

This invention relates to control apparatus and more particularly to liquid level control and valves therefor.

It is the principal object of the present invention to provide a liquid level control apparatus in which the delivery of fluid to a tank or other receptacle is controlled but which has no moving parts.

It is a further object of the present invention to provide liquid control apparatus for controlling the liquid level in a tank or other vessel in which a simple but effective valve is provided responsive to a selected liquid level, and with which fluid can be delivered to, or diverted from the vessel, as determined by the liquid level.

It is a further object of the present invention to provide liquid level control apparatus having as an important component a valve for controlling fluid delivery and which is controlled by a single control connection.

It is a further object of the present invention to provide control apparatus employing a diverting valve in which a fluid interaction chamber is employed, asymmetrical with respect to the axis of a fluid jet directed thereinto.

It is a further object of the present invention to provide a fluid flow control apparatus which includes a fluid interaction chamber of improved construction having a nozzle at one end for directing fluid jet into the chamber, the side walls of the interaction chamber being offset from the mouth of the nozzle in unequal amounts.

Other objects and advantageous features of the invention will be apparent from the description and claims.

The nature and characteristic features of the invention will be more readily understood from the following description taken in connection with the accompanying drawings forming part thereof, in which:

FIGURE 1 is a view in perspective of control apparatus in accordance with the present invention;

FIG. 2 is a horizontal sectional view of a preferred form of diverting valve in accordance with the invention;

FIG. 7 is a fragmentary view similar to FIG. 2 showing a modified form.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in the embodiment of the invention therein illustrated and in which parts are shown diagrammatically, a tank or other vessel 10 is shown having a discharge connection 11 for the delivery of fluid therefrom at any desired rate and for any desired purpose.

The tank 10 has a fluid inlet connection 61 for the delivery of fluid thereinto and has a predetermined location such as at 14 at which the liquid level is to be maintained.

Figure 3:
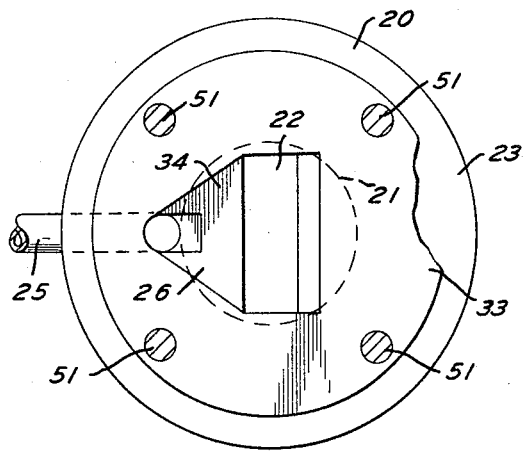
FIG. 3 is a transverse sectional view taken approximately on the line 3—3 of FIG. 2.
Figure 4:
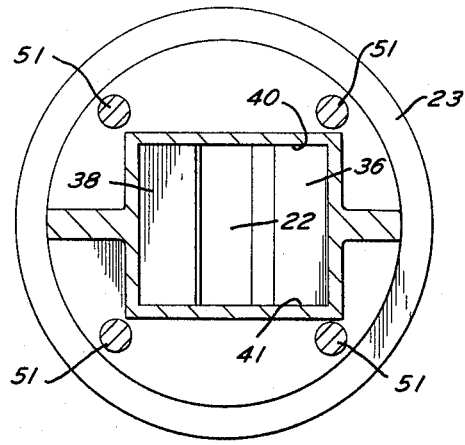
FIG. 4 is a view similar to FIG. 3 taken approximately on the line 4—4 of FIG. 2.
Figure 6:
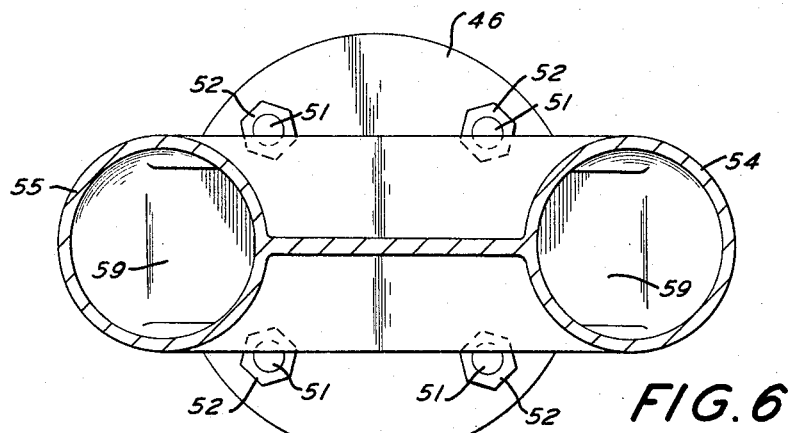
FIG. 6 is a view similar to FIG. 5 taken approximately on the line 6—6 of FIG. 2.
Figure 5:
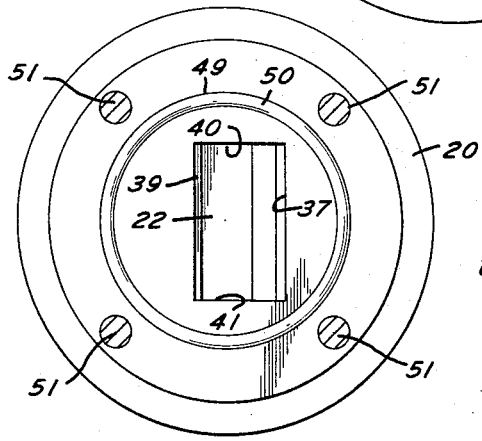
FIG. 5 is a view similar to FIG. 4 taken approximately on the line 5—5 of FIG. 2.

In order to supply fluid to the tank 10 a diverter valve 15 as illustrated in FIGS. 2 to 6 inclusive, is preferably employed.

An inlet pipe 16 is provided for the supply of fluid under pressure, some of which is to be delivered to the tank 10 in accordance with the demand as determined by the level as at 14 of the liquid in the tank 10.

The inlet pipe 16 is connected, in any desired manner, to an inlet section 17. The inlet pipe 16 is preferably of sufficient length to minimize disturbances caused by upstream elements, such as valves or fittings (not shown).

The inlet section 17 serves as a transition region for changing from the circular cross section of fluid flow in the inlet pipe 16 to a rectangular cross section with a minimum of turbulence.

The inlet section 17 preferably includes an inlet portion 18 and an end flange 20 with transition walls 21 therebetween. The walls 21 change in interior shape from circular in cross section at the inlet portion 18 to rectangular in cross section at a nozzle 22 which terminates at the end face 23 of the flange 20. The nozzle 22 is of lesser dimension or narrower from side to side than it is from top to bottom to facilitate the bending or sidewise diversion of the jet issuing therefrom.

The flange 20 has a fluid connection 25 at one side thereof which communicates with a passageway 26 extending to the face 23 of the flange 20 and for determining the pressure conditions at one side of the nozzle 22 as hereinafter explained.

A fluid interaction chamber 30 is provided having a flange 31 with a face 32 for disposition in meeting relation to the face 23 of the flange 20. A fluid tight gasket 33 is preferably interposed between the faces 23 and 32 for preventing fluid leakage at this location. The gasket 33 is preferably relieved to provide a fluid passageway 34 communicating with the passageway 26. The fluid interaction chamber 30 has a mounting flange 35 at its opposite end and intermediate the ends is preferably substantially rectangular in cross section, having opposite diverging and converging wall portions 36 and 37 on one side and diverging and converging wall portions 38 and 39 on the other side.

The top and bottom walls 40 and 41 of the chamber 30 are preferably flat to provide the rectangular shape from end to end of the chamber 30. The fluid interaction chamber 30 has a discharge opening 42.

The shape of the chamber 30 and particularly the wall portions 36 and 37 on one side and 38 and 39 on the other is such that the boundary layer effect of pure fluid interaction devices is utilized with the fluid jet from the nozzle 22 directed to and maintained along one or the other side as hereinafter pointed out.

A fluid delivery section 45 is provided in series relation to the chamber 30 having a flange 46 with a face 47 adapted to be disposed in meeting relation with a face 48 of the flange 35. The flange 35 can have a groove 49 for the reception of a packing 50, such as an O-ring, engaging the face 47.

The inlet section 17, the fluid interaction chamber 30 and the delivery section 45 can be held in assembled relation in any desired manner, but preferably by threaded rods 51 having nuts 52 on the ends thereof and engaging the flanges 20 and 46.

The fluid delivery section 45 preferably has a pair of legs 54 and 55 with a common wall 56 connected at an apex or fluid divider 57 which is offset from the axial line of the jet from the nozzle 22. The discharge legs 54 and 55 preferably have diverging walls 58 for at least partial pressure head recovery from the kinetic energy of the stream or streams of fluid passing therealong.

The legs 54 and 55 are provided with transition sections 59 terminating in outlet connections 60 for standard piping. The leg 55 is connected by the fluid inlet connection 61 to the tank 10, and the other leg 54 is preferably connected by a pipe 62 for delivery of liquid to any other desired location, including a sump.

The fluid connection 25 preferably extends with a continuous downward slope to the tank 10 for drainage and to the predetermined location at 14 at which the liquid level is to be maintained.

The mode of operation will now be pointed out.

Liquid under pressure is supplied through the inlet pipe 16 and passes through the inlet section 17 wherein the shape of the fluid stream is changed from circular in cross section to rectangular in cross section and discharged as a jet, rectangular in cross section, into the fluid interaction chamber 30. The initial direction of the jet is along an axis determined by the shape and orientation of the nozzle 22 and the associated inlet section 17.

As the jet from the nozzle 22 proceeds through the interaction chamber 30, it tends to entrain fluid on each side thereof, thereby reducing the pressure in the side regions between the jet and the walls 36 and 38, respectively.

The region between the jet and the side wall 38 is in communication through the passageway 34 with the connection 25 and fluid will be drawn into the interaction chamber 30 because of the reduced pressure therein. This fluid will be liquid if the level in the tank 10 is above the opening at 14, or will be gas if the liquid level in the tank is below the opening at 14.

The pressure in the interaction chamber 30, on the side between the jet and the wall 38, will be determined by an equilibrium condition wherein the fluid is removed from the chamber 30 by entrainment at the same rate that it is admitted through the connection 25. It will be found that the equilibrium pressure is higher when gas is flowing than when liquid is flowing through connection 25. By properly sizing the opening 25 it is possible to have one of these equilibrium pressures higher and the other lower than the pressure developed between the jet and the opposing wall portion 36.

In order for the pressure between the jet and wall 36 to exceed the pressure between the jet and the wall 38 when liquid is flowing through the connection 25, it is necessary to bias the jet so that it entrains fluid more readily on the side toward the side wall 38, than on the side toward the side wall 36. This may be accomplished by any convenient means, such as unequal off-set between side walls and the center line of said nozzle, as shown in FIG. 2, or by introducing unequal angular relationships between said side walls 36 and 38 and the nozzle, as in FIG. 7, where the angle $\alpha$ is greater than the angle $\beta$.

If a differential pressure of sufficient magnitude is established between opposite sides of the jet in the regions adjacent to the walls 36 and 38, the entire jet will be deflected toward the side with the lower pressure. As the jet stream approaches either of these walls the entrainment on that side of the stream will be increased, with a further reduction in pressure which will cause the jet to snap all the way and lock onto the respective wall. Although the jet clings to either of the divergent wall portions 36 or 38, by reason of the pressure differentials described above, it is redirected by the convergent portions 37 and 39 respectively to emerge from the mouth 42 of the interaction chamber 30 in an opposite direction and with a greater angle of deflection than could be accomplished in the same space with divergent walls alone. Stated another way, the fluid stream for either condition is directed to intersect the path of the fluid stream for the other condition.

Assuming that the liquid level in the tank 10 is below the desired level at 14, air or gas from the tank 10 enters the fluid connection 25 and the passageway 34 causing the jet from the nozzle 22 to move to the walls 36 and 37 so as to be directed by the wall 37 into the delivery leg 55 for delivery through the pipe 61 to the tank 10 for filling.

When the liquid in the tank 10 reaches the level location 14, so as to cover the lower end of the fluid connection 25, air can no longer enter the fluid connection. Depending on the elevation of the passageway 34 above the level of the location 14, either liquid will be drawn into the connection 25 or flow into this connection will cease entirely and, in either event, the pressure between the jet and the side wall 38 will fall below that of the region between the jet and the side wall 36 and the jet will be directed along the walls 38 and 39 and discharge through the leg 54 until the tank level drops and uncovers the tank terminus at 14 of the control fluid connection 25 so that the control signal is again effective.

It will thus be seen that simple but effective control apparatus for liquid level is provided which is reliable in its action and which requires no mechanical moving parts for sensing, signaling or directing the liquid for filling.

I claim:

1. Control apparatus comprising a vessel, and an elongated fluid interaction chamber for controlling the liquid level in the vessel, said interaction chamber being bounded by upper and lower walls and by opposite side walls each with continuous divergent and convergent portions for guiding fluid flow in two different conditions, said chamber having a nozzle member at one end thereof for directing into said chamber a fluid jet along an axis lying between said side walls, portions of said side walls being asymmetrically disposed with respect to the axis of said jet, said chamber having a control opening in one only of said side walls communicating with the divergent portion thereof, said chamber at the other end thereof having a discharge opening for discharging fluid from said chamber in a direction determined by the pressures on the opposite sides of the stream along said divergent side wall portions, a sensing fluid connection for continuous fluid flow in communication with said vessel at the level to be maintained and with said control opening for continuous fluid flow to said opening, and a delivery section connected to said chamber at said discharge opening, said delivery section having a fluid passageway connected to said vessel for fluid delivery thereto.

2. Control apparatus as defined in claim 1 in which said asymmetrically disposed portions of said side walls are offset from the mouth of the nozzle by different amounts.

3. Control apparatus for fluid control comprising an elongated fluid interaction chamber bounded by upper and lower walls and by opposite side walls each with continuous divergent and convergent portions for guiding fluid flow in two different conditions, said chamber having a nozzle member at one end thereof for directing into said chamber a fluid jet along an axis lying between said side walls, portions of said side walls being asymmetrically disposed with respect to the axis of said jet, said chamber having a control opening in one only of said side walls communicating with the divergent portion thereof, said chamber at the other end thereof having a discharge opening for discharging fluid from said chamber in a direction determined by the pressures on the opposite sides of the stream along said divergent side wall portions, said side walls respectively directing the fluid stream in one condition to intersect the path of the fluid stream in the other condition, said asymmetrically disposed portions of said side walls including divergent wall portions disposed at different angles with respect to the axis of the fluid jet.

4. Liquid level control apparatus comprising a vessel, and an elongated fluid interaction chamber for controlling the liquid level in the vessel, said interaction chamber being bounded by upper and lower walls and by opposite side walls each with continuous divergent and convergent portions for guiding fluid flow in two different conditions, said chamber having a nozzle member at one end thereof for directing into said chamber a fluid jet along an axis lying between said side walls, portions of said side walls being asymmetrically disposed with respect to the axis of said jet, said chamber having a control opening in one only of said side walls communicating with the divergent portion thereof, said chamber at the other end thereof having a discharge opening for discharging fluid from said chamber in a direction determined by the pressures on the opposite sides of the stream along said divergent side wall portions, a sensing fluid connection connected to said vessel at the level to be maintained and to said control opening, and a delivery section connected to said chamber at aid discharge opening, said delivery section having a fluid passageway connected to said vessel for fluid delivery thereto, and said asymmetrically disposed portions of said side walls including divergent wall portions at different angles with respect to the axis of the fluid jet.

5. Liquid level control apparatus comprising
a vessel, and
an elongated fluid interaction chamber for controlling the liquid level in the vessel,
said interaction chamber being bounded by upper and lower walls and by opposite side walls each with continuous divergent and convergent portions for guiding fluid flow in two different conditions,
said chamber having a nozzle member at one end thereof for directing into said chamber a fluid jet along an axis lying between said side walls,
portions of said side walls being asymmetrically disposed with respect to the axis of said jet,
said chamber having a control opening in one only of said side walls communicating with the divergent portion thereof,
said chamber at the other end thereof having a discharge opening for discharging fluid from said chamber in a direction determined by the pressures on the opposite sides of the stream along said divergent side wall portions,
a fluid flow connection connected to said vessel at the location of the level to be maintained and to said control opening for continuous fluid flow to said control opening,
said fluid flow connection providing gaseous fluid flow to the interaction chamber when the liquid level is below the location of connection to the vessel and having said gaseous fluid flow cut off when the liquid level is above said location of connection, and a delivery section connected to said chamber at said discharge opening,
said delivery section having a fluid passageway connected to said vessel for fluid delivery thereto.

References Cited by the Examiner

UNITED STATES PATENTS

| | | | |
|---|---|---|---|
| 1,004,629 | 10/1911 | Cook | 137—393 |
| 2,392,300 | 1/1946 | Ziebolz et al. | 137—386 X |
| 3,071,154 | 1/1963 | Cargill et al. | 137—81.5 |
| 3,107,850 | 10/1963 | Warren et al. | 137—81.5 X |
| 3,168,105 | 2/1965 | Cisco et al. | 137—386 |
| 3,192,938 | 7/1965 | Bauer | 137—81.5 |
| 3,193,197 | 7/1965 | Bauer | 137—81.5 X |

M. CARY NELSON, *Primary Examiner.*

S. SCOTT, *Assistant Examiner.*

UNITED STATES PATENT OFFICE
CERTIFICATE OF CORRECTION

Patent No. 3,267,949                                          August 23, 1966

Robert B. Adams

It is hereby certified that error appears in the above numbered patent requiring correction and that the said Letters Patent should read as corrected below.

Column 5, line 13, for "aid" read -- said --; line 17, before "at" insert -- disposed --.

Signed and sealed this 1st day of August 1967.

(SEAL)
Attest:

EDWARD M. FLETCHER, JR.                          EDWARD J. BRENNER
Attesting Officer                                        Commissioner of Patents